Aug. 18, 1970   HITOSI IYOI ET AL   3,524,361
GEAR TRANSMISSION AND CAM MECHANISM OF A POINT
CONTACT SYSTEM WITH AXES AT ANGLES
TO EACH OTHER
Filed Aug. 29, 1968   2 Sheets-Sheet 1
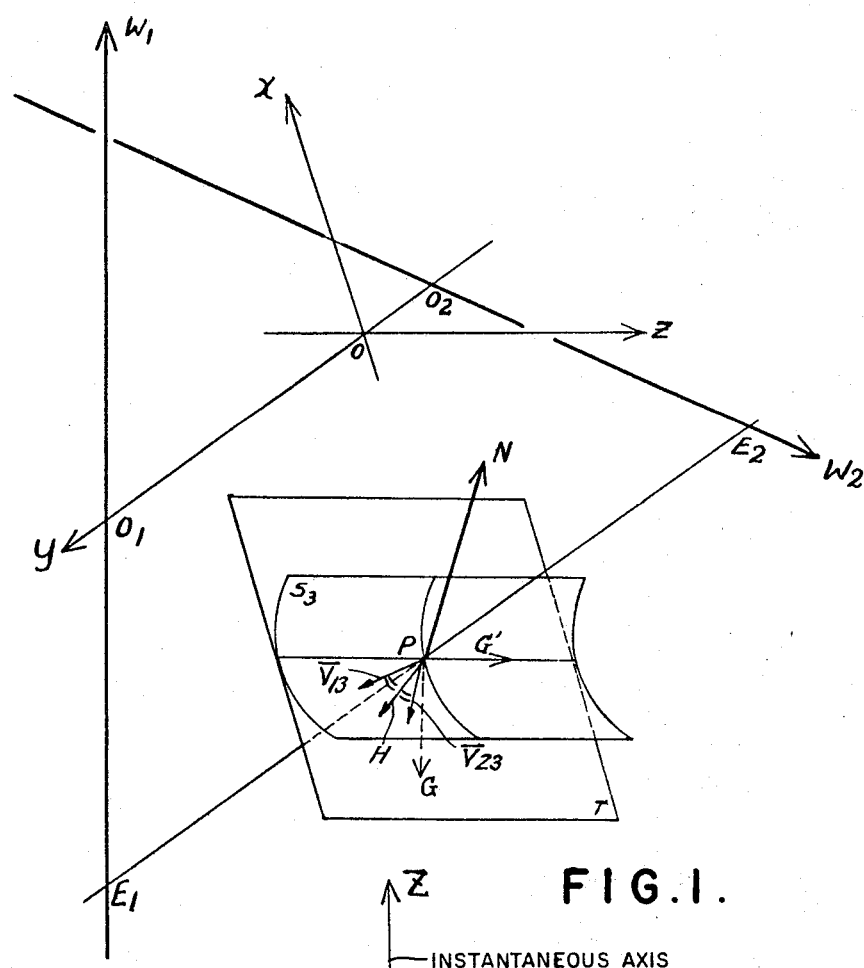
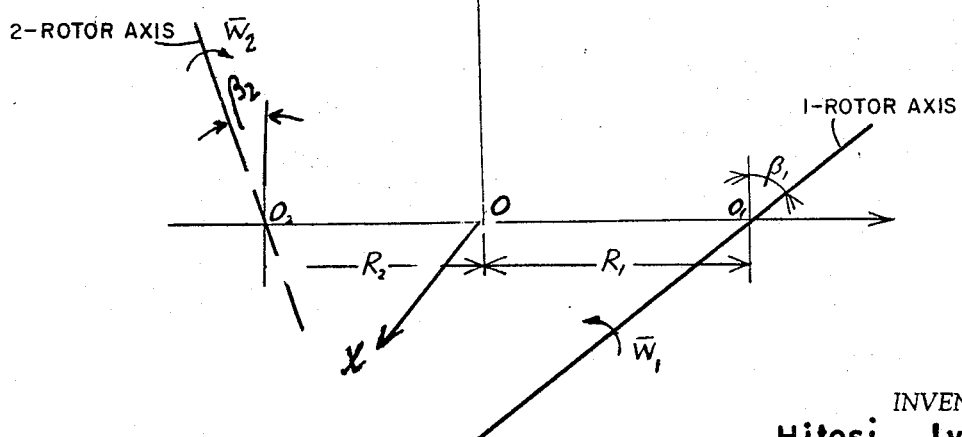
FIG.1.
FIG.3.
INVENTORS
Hitosi Iyoi &
Sakae Togashi
BY *Otto John Munz*
ATTORNEY

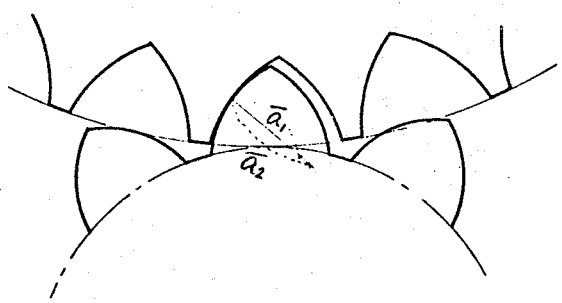
FIG.7.
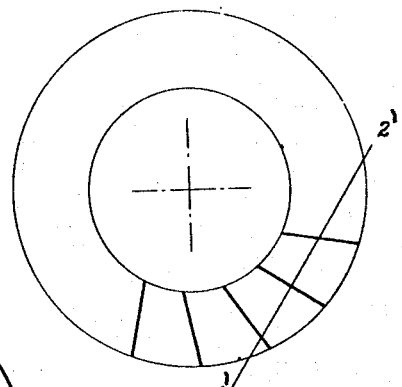
FIG.6.
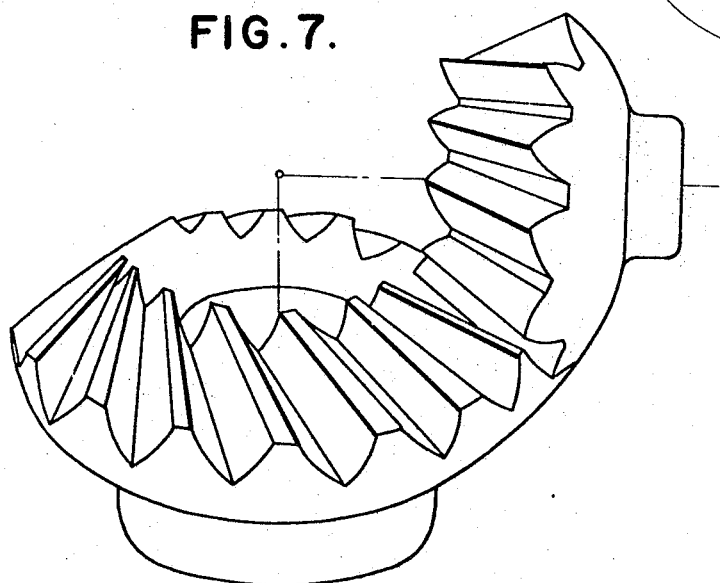
FIG.4.
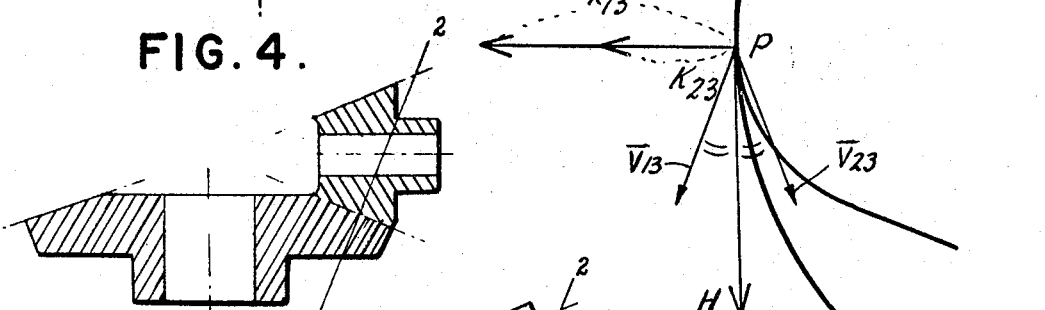
FIG.8.
FIG.2.
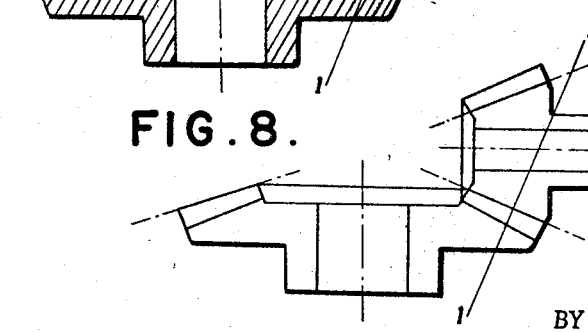
FIG.5.
INVENTORS
Hitosi Iyoi &
Sakae Togashi
BY
ATTORNEY United States Patent Office 3,524,361
Patented Aug. 18, 1970

3,524,361
GEAR TRANSMISSION AND CAM MECHANISM OF A POINT CONTACT SYSTEM WITH AXES AT ANGLES TO EACH OTHER
Hitosi Iyoi, 6–3 Moto-Okubo-3, Narashino-shi, Japan, and Sakae Togashi, % Chiba Institute of Technology, Yatsu-machi, Narashino-shi, Japan
Filed Aug. 29, 1968, Ser. No. 756,134
Int. Cl. F16h 1/14, 55/04
U.S. Cl. 74—417                                    7 Claims

ABSTRACT OF THE DISCLOSURE

A gear transmission and cam mechanism of a point contact system comprising a pair of intermeshing gears or cams having axes lying at anlges to each other. The gears or cam surfaces have profiles in a plane running through the current position of contact of the working surfaces and perpendicular to the instantaneous axis of movement of the working surfaces. The profiles are curves which has a set of radii in said plane chosen so that:

$$H = V_{23}/|V_{23}| \pm V_{13}/|V_{13}|$$

where H is a tangential vector at a contact point to the line of locally linear contact and $V_{23}/|V_{23}|$ and $V_{13}/|V_{13}|$ are unit relative velocity vectors of the pinion and wheel relating to the generating tooth surface. According to the equation, H can be parallel to one of the bisectors of the unit relative velocity vectors $V_{23}/V_{23}$ and $V_{13}/V_{13}$. This condition produces optimum conformity of the two mating tooth surfaces.

THE FIELD OF THE INVENTION

The provision of gear transmission and cam mechanisms of the point contact system having pairs of intermeshing gears with crossing axes such as hypoid gears and with intersecting axes such as bevel type gears with gear surfaces generated by a conical or a cylindrical surface engaged in a given movement especially suitable for high-power transmissions.

DESCRIPTION OF THE PRIOR ART

The prior art is represented by U.S. Pat. No. 1,601,750 to Wildhaber and No. 3,338,110 to the present inventor, H. Iyoi, and U.S.S.R. Pat. No. 109,750 to Novikov of 1956. These patents represent developments of gear surfaces with parallel axes and as to the second above, of gear surfaces with a minimum effective curvature in a plane normal to the line of instantaneous contact. Excepting the second, these systems have limitations, based on the determination of a point system of meshing as one of the modified systems relating to a certain linear system of meshing. Their surfaces do not always maintain a local-linear contact at every contact point on a three-dimensional path and are developed to maintain such contacts only by approximation.

SUMMARY OF THE INVENTION

The objects of this invention are to provide gear transmissions and cam mechanisms of the type mentioned with a point system of meshing avoiding the limitations of the prior art; which have an optimum contact strength; an increased load capacity and torque delivery; which possess an optimum three-dimensional path of the curvatures of the mating surfaces; and in particular to provide transmissions of the type mentioned, which have intersecting axes, such as bevel gear, or crossing axes such as hypoid gear, with both external and internal meshings with fixed transmission ratios.

BRIEF DESCRIPTION OF THE DRAWINGS

FIG. 1 shows various associated elements necessary to construct gear tooth surfaces at a contact point P on generating surface $S_3$, as envelope of a tool tooth surface in accordance with the present invention;

FIG. 2 is a sectional view by a tangential plane formed by two contact lines $C_{13}$, $C_{23}$, both relating to generating surface $S_3$.

FIG. 3 is a geometrical representation of the elements of the invention in accordance with equations recited in the application;

FIG. 4 shows in perspective view an example of bevel gears constructed in accordance with the invention;

FIG. 5 shows the assembly in cross section;

FIG. 6 shows the invention in a plan view;

FIG. 7 shows a plan view of the tooth profiles taken in the sectional plane indicated by straight lines 1–2 of FIG. 5 and 1'–2' of FIG. 6; and FIG. 8 is a cross-sectional view of a cam construction in accordance with the invention.

DESCRIPTION OF THE PRIOR ART

Contrary to one of the essential characteristics of Novikov-type meshing, defining the profile of a gear tooth by the radius of curvature forming a circumferential arc with a center falling on the point of intersection of the plane under consideration and the instantaneous axis (as disclosed in U.S.S.R. Pat. No. 109,113), the point system meshing devices of the present invention are not subject to such limitation. here is no ambiguity or confusion in determining the profile of the cooperating gear or cam member.

The tooth profiles of the gear transmissions and cam mechanisms of this invention comprise a series of points, circular arcs, or analogous curves defining the profiles of the mating teeth in a plane perpendicular to the instantaneous axis of movement of the mating components, which passes through the contact point of the mating gears or cam components.

The reason why the proposed gear transmission can bear greater load capacity is that the design of gears can be done in such a way that effective curvature transverse to an instantaneously contacting line or more exactly to a locally linear contact line is minimized. Thus the area of ellipse as a compressed area of two mating tooth surfaces can be maximized under the constant total loading and the surface strength can be maximized in accordance with the beam strength, when the location of a contact zone is preferably determined.

In order to generate a pair of gear surfaces with crossing axes which do contact linearly, a specified screw movement determined by a relative position of two gear axes and the angular velocity ratio for the generating surfaces is provided.

Generally speaking, the surfaces of gears generated by a given surface should have a point system if any screw movement is given to the above generating surface. Consequently, this system should have more degrees of freedom than linear systems. The present invention uses such freedoms for easier manufacturing procedures and for obtaining better conformity in order to provide improved gear strength for high power transmission.

The gear transmission of the present invention is restricted to a conical or a cylindrical generating surface engaged in a specified screw movement, that is, in a pure translational movement or a pure rotational one.

In accordance with this invention, a locally linear contact can be achieved at a contact zone, thus permitting optimum contact conditions. With reference to FIGS. 1, 2 and 3, the y-axis is perpendicular both to 1-axis (for example, pinion) and 2-rotor (wheel)-axis;

the z-axis is an instantaneous axis relating to 1- and 2-rotor axes, as indicated in FIG. 3;

the x-axis is perpendicular both to y- and z-rotor axes;

$S_3$=generating surface (conical or cylindrical one).

N=vector indicating normal to $S_3$ at a contact point P.

T=tangential plane of $S_3$ at point P.

$V_1$, $V_2$ are velocity vectors of 1- and 2-rotor axes.

$V_3$ is the velocity vector of the generating surface $S_3$.

$V_{21}=V_2-V_1$ is the relative velocity vector of 2-rotor pertaining to 1-rotor.

$W_{13}=W_1-W_3$, $W_{23}=W_2-W_3$, where $W_1$, $W_2$ and $W_3$ represent the angular velocity of 1-rotor, 2-rotor and generating surface $S_3$ respectively, with respect to FIG. 1 and FIG. 3, $E_1E_2$ is a straight line passing through the point P and which intersects both 1 and 2 rotor axes.

G′ represents a unit vector parallel to generator of $S_3$.

G represents a unit vector lying on a tangential plane passing through P and orthogonal to G′.

H is a vector tangential to the line of locally linear contact, the direction of which can be determined so as to increase conformity at the contact point P.

$C_{13}$, $C_{23}$ are contact curves on each rotor surfaces. (1- to 3-rotor, and 2- to 3-rotor).

K is the principal curvature in the sectional plane which includes the surface normal N and the tangential unit vector G. In other words K is the inverse of the radius of curvature at P on said plane; K′ is curvature in the sectional plane formed by two vectors N and G′. $K_{13}$, $K_{23}$ are vectors lying on a tangential plane and which are transverse to the line of instantaneous contact. $Q_{13}=W_i \times V_3 - W_3V_i$, where $i=1, 2$.

$U \times V$=vector product of two vectors U and V. (U, V)=scalar product or inner product of U and V.

Line $O_1O_2$ is taken as the shortest distance between 1- and 2-rotor axes.

It can be demonstrated theoretically that in the case when two vectors $Q_{13}$ and N or $Q_{23}$ and N do not intersect orthogonally, the direction of the line of locally linear contact is determined uniquely. On the other hand, when the two vectors intersect orthogonally, the direction of locally linear contact is arbitrarily determined.

Locally linear contact can be defined in the following manner: radii of curvature of two mating tooth surfaces in a plane transverse to line of instantaneous contact are equal to each other. Thus in FIG. 7, $a_1$ and $a_2$ should be approximately equal. In other words, $a_1-a_2$ or $1/a_1-1/a_2$ should be minimized.

However, it is not always possible to maintain such behaviour-locally linear contact—at every point on a spatial path of contact points.

Consequently, such state of contact can be maintained generally at the neighbouring portion of a suitable point taken on one of the mating gear surfaces, probably at the middle point or its neighbouring point along the length of rotors.

As an example, improved skew gears can be created in accordance with this invention. Ordinarily skew gears are generated or manufactured by a translational movement of a plane.

Instead of such a plane, the present invention uses an appropriate spatial surface to create skew gears having greater strength.

CASE 1

Taking 1-rotor (as pinion) and 2-rotor (as wheel), H is a vector parallel to $V_{21}$ and the generalized Novikov gear can be created.

The reason is as follows.

The prototype of the Novikov gears has in a circular arc whose center is coincident with the pitch point in culmination in a transverse section to parallel axes. One of the main features of this type of gears is the parallelism of relative velocity and tangential direction of the line of instantaneous contact. In order to extend this characteristic of gears to gears with skew axes, the case when H and $V_{21}$ are parallel should be considered.

CASE 2

When H is taken as a vector parallel to one of the lines of curvature, the generalized Wildhaber gear can be created.

The reason is as follows:

The prototype of the Wildhaber gears has a circular arc, the center of which is coincident with the pitch point in a normal section to tooth. One of the characteristics of this type of gears is the coincidence of the line of curvature and the line of instantaneous contact. In order to extend this feature to gears with crossing axes, the case when H and G are parallel should be considered.

CASE 3

In order to provide better conformity than those described in cases 1 and 2 above, the direction of H is determined as the direction of one of the bisectors of $V_{13}$ and $V_{23}$. This condition leads to the reduction of effective curvature at a contact point, in a plane transverse to the line of locally linear contact, whereby conformity is considerably improved.

H and 2 $(A+B)$ (in absolute value), which is equal to the effective curvature, are given by the following equation:

$$H=V_{23}/|V_{23}| \pm V_{13}/|V_{13}|$$

where notation $|\ |$ means the absolute value. Denoting equations of each rotor surface by a normalized form and subtracting, $Z_2-Z_1=Ax^2+By^2$, then $$2(A+B)=\frac{|V_{21}|^2(Q_{21},N)}{|V_{13} \times V_{23}|^2}\left\{1-\left(\frac{|V_{13}| \pm |V_{23}|}{V_{21}}\right)^2\right\}$$

is effective curvature optimized by the use of the value of H above; a condition without interferences is given by $AB \geq 0 \rightleftarrows (M_{13} \cdot M_{23} < O)$ or in particular $$AB=O \rightleftarrows K_{13} \times K_{23}=0.$$

A condition necessary to transmit power continuously is given by the equation:

$$(Q_{21},N)(V_2,N)\left\{|-\left(\frac{|V_{13}| \pm |V_{23}|}{|V_{21}|}\right)^2\right\} \geq 0$$

In particular, when $S_3$ is engaged in translational movement, a condition necessary to have locally linear contact at every point on a spatial path of contact points is given as follows:

$$K=\frac{[\tau,G,N]}{(\lambda_1 V_{13}{}^0+\lambda_2 V_{23}{}^0,G)}, \quad K'=\frac{[\tau,G',N]}{(\lambda_1 V_{13}{}^0+\lambda_2 V_{23}{}^0,G')}$$

where $\tau$ is the translational velocity vector of $S_3$; $\lambda_1$, $\lambda_2$ are parameters satisfying $$\lambda_1+\lambda_2=1, \quad \lambda_1 \geq 0, \quad \lambda_2 \geq 0$$

and $V_{13}{}^\circ$, $V_{23}{}^\circ$ are constants.

Equation $[A, B, C]=(A \times B, C)=(A, B \times C)$

: scalar quantity

K, K′ are curvatures in the directions of G and G′.

The respective gears have profiles in a plane formed by the two straight lines; the one passing through the current position of a contact point of the working surfaces and perpendicular to the instantaneous axis of movement of the working surfaces, and the other having the direction of the relative velocity vector corresponding to said current position of the contact point, said profiles being curves having a set of radii in said plane determined by the following equations:

$$\bar{a}_1 = \frac{\rho D\left(\frac{1}{R_1}-\frac{1}{R_2}\right)\frac{(A,N)}{(Q,N)}|G_1|^{1/2}}{\left[1+D\left(\frac{1}{R_1}-\frac{1}{R_2}\right)\frac{(A,N)}{(Q,N)}\right]|G_1|^{1/2}-|G_2|^{1/2}} > 0$$

$$\bar{a}_2 = \frac{\rho D\left(\frac{1}{R_2}-\frac{1}{R_1}\right)\frac{(A,N)}{(Q,N)}|G_2|^{1/2}}{G_1^{1/2}-\left[1-D\left(\frac{1}{R_1}-\frac{1}{R_2}\right)\frac{(A_1 N)}{(Q_1 N)}\right]G_2^{1/2}} > 0 \quad (1)$$

Wherein, symbols involved in the above equations are explained with reference FIG. 3 as follows:

$$D = R_1\omega_1 \cos\beta_2 = R_2\omega_2 \cos\beta_2$$

$\omega_1$, $\omega_2$, are absolute values of angular velocity vectors of $\varpi_1$ and $\varpi_2$;

$R_1$, $R_2$ are angles subtended by instantaneous axis and each rotor axis 1 and 2, respectively.

$O_1$, $O_2$ are intersecting points of two straight lines; the one being common normal to 1 and 2 axes, and the other being each rotor axis 1 for $O_1$, and 2 for $O_2$.

$$\Omega = \text{reduced pitch} = \frac{C}{D}R_1 R_2 = \frac{D}{C}\tan\beta_1\cdot\tan\beta_2$$

$$A = \begin{pmatrix} x_0 \\ y_0 \\ O \end{pmatrix}$$

contact point vector lying in $xy$-plane, expressed by matricial notation.

$$\rho = (x_0^2+y_0^2+\Omega^2)/(x_0^2+y_0^2)^{1/2}, \quad Q = \begin{pmatrix} Cz \\ D+C\Omega \\ -Cx_0 \end{pmatrix}$$

is vector.

$E_1$, $F_1$, $G_1$ are coefficients of first fundamental forms of gear surface $S_1$ (pinion), and $E_2$, $F_2$, $G_2$ are those of $S_2$ (gear).

As an example, specification of the above equations is shown below in the case of gears with parallel axes $$\bar{a}_1 = \frac{(r^2/\sin\alpha)(1/R_1-1/R_2)T_1^{1/2}}{\{1+(r/\sin\alpha)\}(1/R_1-1/R_2)T_1^{1/2}-T_2^{1/2}}$$

$$\bar{a}_2 = \frac{(\cdot r^2/\sin\alpha)(1/R_1-1/R_2)T_2^{1/2}}{T_1^{1/2}-\{1+(\lambda/\sin\alpha)(1/R_1-1/R_2)T_2^{1/2}\}} \quad (2)$$

wherein $$T_1 = \left(\sin\alpha-\frac{r}{R_1}\right)^2+\cos^2\alpha+\cot^2\beta$$

$$T_2 = \left(\sin\alpha-\frac{r}{R_2}\right)^2+\cos\alpha^2+\cot^2\beta$$

$\alpha$ = pressure angle in a transverse section to axes
$\beta$ = helix angle
$r$ = distance of a contact point from its pitch point
$R_1$, $R_3$ = radius of respective pitch circle In an analogous manner a proposed transmission is specified in the case of a gear of the bevel—or of hypoid gear type and of a cam mechanism having frictional or serated cone surfaces, truncated or not. In the gear-type transmission $R_1 = R_2 = O$, $(W_1, W_2) = O$, etc., can be used to specify Equation 1, same as in the case of reducing Equation 2 from Equation 1 for gears with parallel axes.

In FIGS. 4 to 7, examples of actual bevelled gear built in accordance with the present invention are exhibited.

These figures are based on:
Pressure angle—$\alpha = 25$
Helix angle—$\beta = 10°$
Module in a plane transverse to tooth—$m = 1$
Number of pinion—$z_1 = 20$
Number of gear—$z_2 = 40$ Therefore, assuming that number of rotation of pinion is $n_1 = 1800$ r.p.m., $\omega_1$ (angular velocity of pinion)
$= 2\pi \times 1800/60 = 60\pi = 60\times 3.1416$ (radian), i.e., $$\omega_2 = \omega_1\cdot\frac{\sin\beta_1}{\sin\beta_2}\cdot\beta_1 = 26°34', \quad \beta_2 = 63°26'$$

In FIG. 8 an example of a cam transmission having cone surfaces (frictional or serated) based on the same equations, is given.

It should be understood, of course, that the foregoing disclosure relates to only preferred embodiments of the invention and that it is intended to cover all changes and modifications of the example herein chosen for the purposes of the disclosure, which do not constitute departure from the spirit and scope of the invention set forth in the appended claims.

We claim:

1. A torque transmitting device comprising:

a pair of shafts mounted for axial rotation with their axes at an angle to each other;

a pair of bodies having working surfaces capable of transmitting torque on rotational contact with each other;

said bodies mounted on said shafts, one on each respectively, in a torque transmitting perimeter contact with each other;

means to rotate said shafts;

the respective said bodies having profiles in a plane formed by the following straight lines: a first line passing through the current position of a contact point of said working surfaces and perpendicular to the instantaneous axis of movement of the said working surfaces and a second line having the direction of the vector of relative velocity corresponding to said current position of the said contact point, said profiles being curves having a set of radii in said plane determined in accordance with the following equation:

$$H = V_{23}/|V_{23}|\pm V_{13}/|V_{13}|$$

wherein H is a tangential vector at a contact point to the line of locally linear contact and $V_{23}/|V_{23}|$ and $V_{13}/|V_{13}|$ are unit relative velocity vectors representing the difference between the velocity vectors associated with the surface of one of said bodies and a gnerating surface and between the velocity vectors associated with the surface of the other of said bodies and said generation surface;

a set of radii $a_1$ and $a_2$ of said profiles being expressed as follows:

$$[\bar{a}_1]a_1 = \frac{\rho D\left(\frac{1}{R_1}-\frac{1}{R_2}\right)\cdot\frac{(A,N)}{(Q,N)}|G_1|^{1/2}}{\left[1+D\left(\frac{1}{R_1}-\frac{1}{R_2}\right)\frac{(A,N)}{(Q,N)}\right]|G_1|^{1/2}-|G_2|^{1/2}}$$

$$[\bar{a}_2]a_2 = \frac{\rho D\left(\frac{1}{R_1}-\frac{1}{R_2}\right)\cdot\frac{(A,N)}{(Q,N)}|G_2|^{1/2}}{|G_1|^{1/2}-\left[1-D\left(\frac{1}{R_1}-\frac{1}{R_2}\right)\frac{(A,N)}{(Q,N)}\right]|G_2|^{1/2}}$$

wherein [$E_1$, $F_1$ are coefficients of the first fundamental form of 1-rotor surface: $E_2$, $F_2$, $G_2$ are those of 2-rotor surface: $P_1$, $P_2$ are angles subtended by the instantaneous axis and each rotor axis 1 and 2.]

$$D = R_1\omega_1 \cos\beta_1 = R_2\omega_2 \cos\beta_2$$

$$C = \omega_1 \sin\beta_1 = \omega_2 \sin\beta_2$$

$$\Omega = \text{reduced pitch} = \frac{C}{D}R_1 R_2 = \frac{D}{C}\tan\beta_1\cdot\tan\beta_2$$

$A = \begin{pmatrix} x_0 \\ y_0 \\ O \end{pmatrix}$, contact point vector expressed by matricial notation.

$$\rho = (x_0^2 + y_0^2 + \Omega^2)/(x_0^2 + y_0^2)^{1/2}$$

$$Q = \text{vector shown by} \begin{pmatrix} C_z \\ D + C\Omega \\ -Cx_0 \end{pmatrix}$$

and wherein $\beta_1$ and $\beta_2$ are angles subtended by the instantaneous axis and each of said axes, the y-axis being oriented so that it intersects both said axes in two points, the distance between said two points being the shortest distance between said axes, $R_1$ being the distance from the zero point of said y-axis to one of said two points, $R_2$ being the distance from said zero point of said y-axis to the other one of said two points; $x$, $y$ and $z$ being rectangular coordinates; and wherein $\omega_1$ and $\omega_2$ are the scalar values of the angular velocity vectors of the surfaces of each of said bodies, N is a vector normal to said generating surface at its point of contact with the surface of one of said bodies, and $G_1$ and $G_2$ are unit vectors orthogonal to the surfaces of each of said bodies respectively at their point of contact with said generating surface.

2. A torque transmitting device as claimed in claim 1 said pair of axes mounted to intersect each other.

3. A torque transmitting device as claimed in claim 1 said pair of axes crossing spaced from each other.

4. A torque transmitting device as claimed in claim 1 said bodies being intermeshing gears.

5. A torque transmitting device as claimed in claim 1 said bodies being cams in frictional engagement.

6. A torque transmitting device as claimed in claim 1 said bodies being serated cams in engagement.

7. A torque transmitting device comprising:
   a pair of shafts mounted for axial rotation with their axes at an angle to each other;
   a pair of bodies having working surfaces capable of transmitting torque on rotational contact with each other;
   said bodies mounted on said shafts, one on each respectively, in torque-transmitting perimeter contact with each other;
   means to rotate said shafts;
   the respective said bodies having profiles in a plane formed by the following straight lines: a first line passing through the current position of a contact point of said working surfaces and perpendicular to the instantaneous axis of movement of the said working surfaces and a second line having the direction of the vector of relative velocity corresponding to said current position of the said contact point, said profiles being curves having a set of radii in said plane determined in accordance with the following equation:

$$H = V_{23}/|V_{23}| \pm V_{13}/|V_{13}|$$

where H is a tangential vector at a contact point of the line of locally linear contact and $V_{23}/|V_{23}|$ and $V_{13}/|V_{13}|$ are unit relative velocity vectors representing the difference between the velocity vectors associated with the surface of one of bodies and a generating surface and between the velocity vectors associated with the surface of one of said bodies and a generating surface and between the velocity vectors associated with the surface of the other of said bodies and said generating surface.

References Cited

UNITED STATES PATENTS

| | | | |
|---|---|---|---|
| 2,954,704 | 10/1960 | Saari | 74—459.5 X |
| 2,961,888 | 11/1960 | Wildhaber | 74—459.5 |
| 3,180,172 | 4/1965 | Leggatt | 74—462 |
| 3,371,552 | 3/1968 | Soper | 74—462 |

LEONARD H. GERIN, Primary Examiner

U.S. Cl. X.R.

74—423, 459.5